(12) United States Patent
Pomeroy

(10) Patent No.: US 10,426,071 B2
(45) Date of Patent: Oct. 1, 2019

(54) MICRO-TILLER MODULE

(71) Applicant: Dennis Cole Pomeroy, Charlie Lake (CA)

(72) Inventor: Dennis Cole Pomeroy, Charlie Lake (CA)

( * ) Notice: Subject to any disclaimer, the term of this patent is extended or adjusted under 35 U.S.C. 154(b) by 671 days.

(21) Appl. No.: 15/163,713

(22) Filed: May 25, 2016

(65) Prior Publication Data

US 2017/0339817 A1  Nov. 30, 2017

(51) Int. Cl.
*A01B 1/06* (2006.01)

(52) U.S. Cl.
CPC .................. *A01B 1/065* (2013.01)

(58) Field of Classification Search
CPC ............................ A01B 1/065; A01B 33/027
USPC .......................................................... 172/41
See application file for complete search history.

(56) References Cited

U.S. PATENT DOCUMENTS

| | | | |
|---|---|---|---|
| 2,805,611 A | 5/1951 | Fletchall | |
| 2,779,259 A * | 1/1957 | Kelsey .................. | A01B 1/065 172/111 |
| 3,017,733 A * | 1/1962 | Evans .................... | A01D 34/84 172/41 |
| 3,710,870 A | 1/1973 | Pfeiffer | |
| 4,049,059 A | 9/1977 | Weibling | |
| 4,213,504 A * | 7/1980 | Schneider .............. | A01B 1/065 172/25 |
| 4,421,176 A * | 12/1983 | Tuggle et al. ....... | A01B 33/027 172/112 |
| D349,021 S * | 7/1994 | Gutknecht .......... | D8/1 |
| 5,404,644 A | 4/1995 | Needham et al. | |
| 5,850,882 A * | 12/1998 | Link ...................... | A01B 1/065 172/41 |
| 5,909,778 A | 6/1999 | Acosta et al. | |
| 5,960,889 A | 10/1999 | McLaren | |
| 5,988,292 A | 11/1999 | Knotts | |
| 2006/0070753 A1 * | 4/2006 | Lephart .................. | A01B 1/065 172/41 |
| 2007/0131436 A1 | 6/2007 | Asay | |
| 2008/0011497 A1 | 1/2008 | Catlin | |
| 2015/0034391 A1 | 2/2015 | McLain | |
| 2016/0192573 A1 * | 7/2016 | Mattson .................. | F16H 1/222 172/41 |
| 2016/0309640 A1 * | 10/2016 | Marken ................ | A01B 33/027 |
| 2017/0223886 A1 * | 8/2017 | Parkey ................... | A01B 1/065 |

* cited by examiner

*Primary Examiner* — Robert E Pezzuto
*Assistant Examiner* — Joel F. Mitchell
(74) *Attorney, Agent, or Firm* — Black, McCuskey, Souers & Arbaugh LPA

(57) ABSTRACT

A micro-tiller module that is releasibly engageable with a hand drill can include a gear box assembly, first and second tilling wheel assemblies, and a stabilizer fork. The gear box assembly can include a housing, an input shaft extending along an input shaft axis, first and second output shafts, and a plurality of gears. The external end of the input shaft is configured to be releasibly engageable with a chuck of the hand drill. The tilling wheel assemblies can be respectively mounted to the output shafts. The stabilizer fork can extend from a base end fixed to the housing, along a stabilizer axis transverse to the input shaft axis, to a distal end from which first and second tines project. Each of the tines can extend further along the input shaft axis than transverse to the input shaft axis.

20 Claims, 4 Drawing Sheets

MICRO-TILLER MODULE

BACKGROUND

1. Field

The present disclosure relates to an apparatus for working the earth in situ including an earth working element which cuts into the ground and has a rolling motion as it is positively moved with respect to its support with a continuous or cyclic motion.

2. Description of Related Prior Art

U.S. Pat. No. 4,049,059 discloses a combined garden cultivator and lawn edger. In the '059 patent, an elongated inclined support arm is provided and a horizontal transverse shaft member is journaled from the lower end of the support arm and supports a rotary blade assembly thereon spaced to one side of the support arm. An electric motor is supported from the upper end of the support arm and includes an output shaft paralleling the support arm and extending downwardly along the latter toward the lower end thereof from which a right angle gear transmission is supported having an input shaft projecting toward the upper end of the support arm and an output shaft of which the rotary shaft member comprises a part. A drive shaft extends along the support arm and drivingly connects the motor output shaft to the transmission input shaft and an intermediate portion of the drive shaft is journaled from a corresponding intermediate portion of the support arm. An arcuate shield panel is supported from the transmission output shaft and the lower end of the support arm in position partially embracingly encircling the rotary blade assembly and opening toward the latter away from the upper end of the support arm. The shield panel is supported for oscillation about the axis of rotation of the transmission output shaft and one arch end of the shield includes a ground engaging support portion, structure being connected between the shield panel and the support arm for releasably retaining the shield panel in adjusted angularly displaced position and yieldingly biasing the shield panel from one limit of oscillation thereof toward the other limit of oscillation thereof.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A micro-tiller module that is releasably engageable with a hand drill can include a gear box assembly, first and second tilling wheel assemblies, and a stabilizer fork. The gear box assembly can include a housing, an input shaft, a first output shaft, a second output shaft, and a plurality of gears. The input shaft can extend along an input shaft axis through the housing between a first end positioned outside of the housing and a second end positioned inside of the housing. The first output shaft can extend along an output shaft axis transverse to the input shaft axis and through the housing between a first end positioned outside of the housing and a second end positioned inside of the housing. The second output shaft can extend along the output shaft axis and through the housing between a first end positioned outside of the housing and a second end positioned inside of the housing. The plurality of gears can be positioned inside of the housing and can be arranged such that the first output shaft and the second output shaft rotate in response to rotation of the input shaft. The first end of the input shaft is configured to be releasably engageable with a chuck of the hand drill. The first tilling wheel assembly can be mounted at the first end of the first output shaft. The second tilling wheel assembly can be mounted at the first end of the second output shaft. Each of the first and second tilling wheel assemblies having a hub and plurality of blades projecting away from the hub. The stabilizer fork can extend from a base end fixed to the housing, along a stabilizer axis transverse to the input shaft axis and to the output shaft axis, to a distal end from which first and second tines project. Each of the first and second tines can extend further along the input shaft axis than transverse to the input shaft axis.

BRIEF DESCRIPTION OF THE DRAWINGS

The detailed description set forth below references the following drawings.

DETAILED DESCRIPTION

Figure 1:
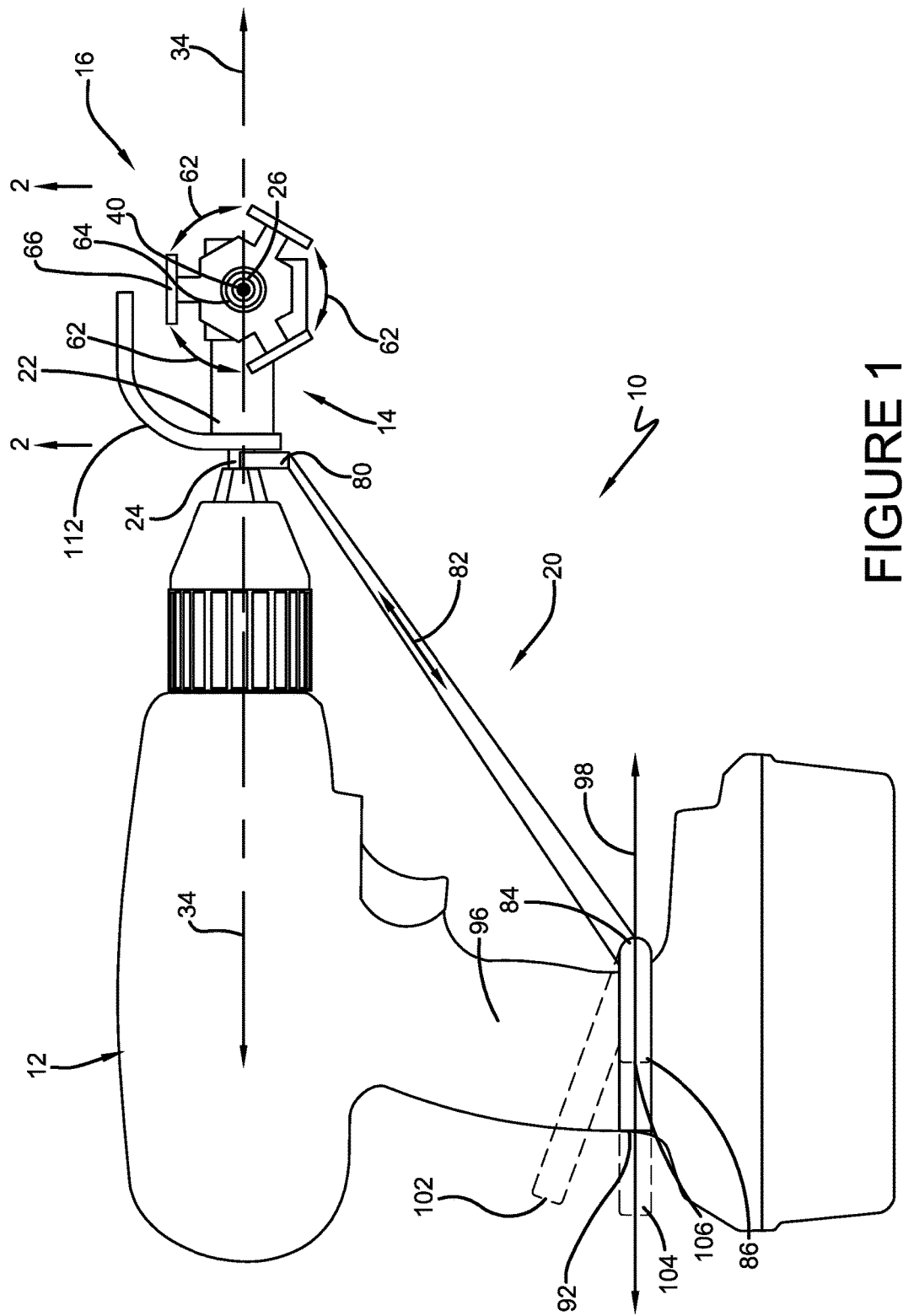
FIG. 1 is side view of an exemplary embodiment of the present disclosure attached to a hand drill.

The present disclosure, as demonstrated by the exemplary embodiments described below, provides an improved attachment or module for working the earth that can be releasibly attached to a hand drill. A micro-tiller module 10 that is releasably engageable with a hand drill 12 can include a gear box assembly 14, first and second tilling wheel assemblies 16, 18, and a stabilizer fork 20. The micro-tiller module 10 and the hand drill 12 can be releasably engagable with one another. In other words, the micro-tiller module 10 can be mounted on hand drill 12 to accomplish rotation of the first and second tilling wheel assemblies 16, 18 and working of earth; the micro-tiller module 10 can be removed from the hand drill 12 without damage to the micro-tiller module 10 or the hand drill 12 and can be re-attached to again accomplish rotation of the first and second tilling wheel assemblies 16, 18 and working of earth; the micro-tiller module 10 or the hand drill 12 can be replaced with a newer version thereof and can engage the remaining component.

Figure 2:
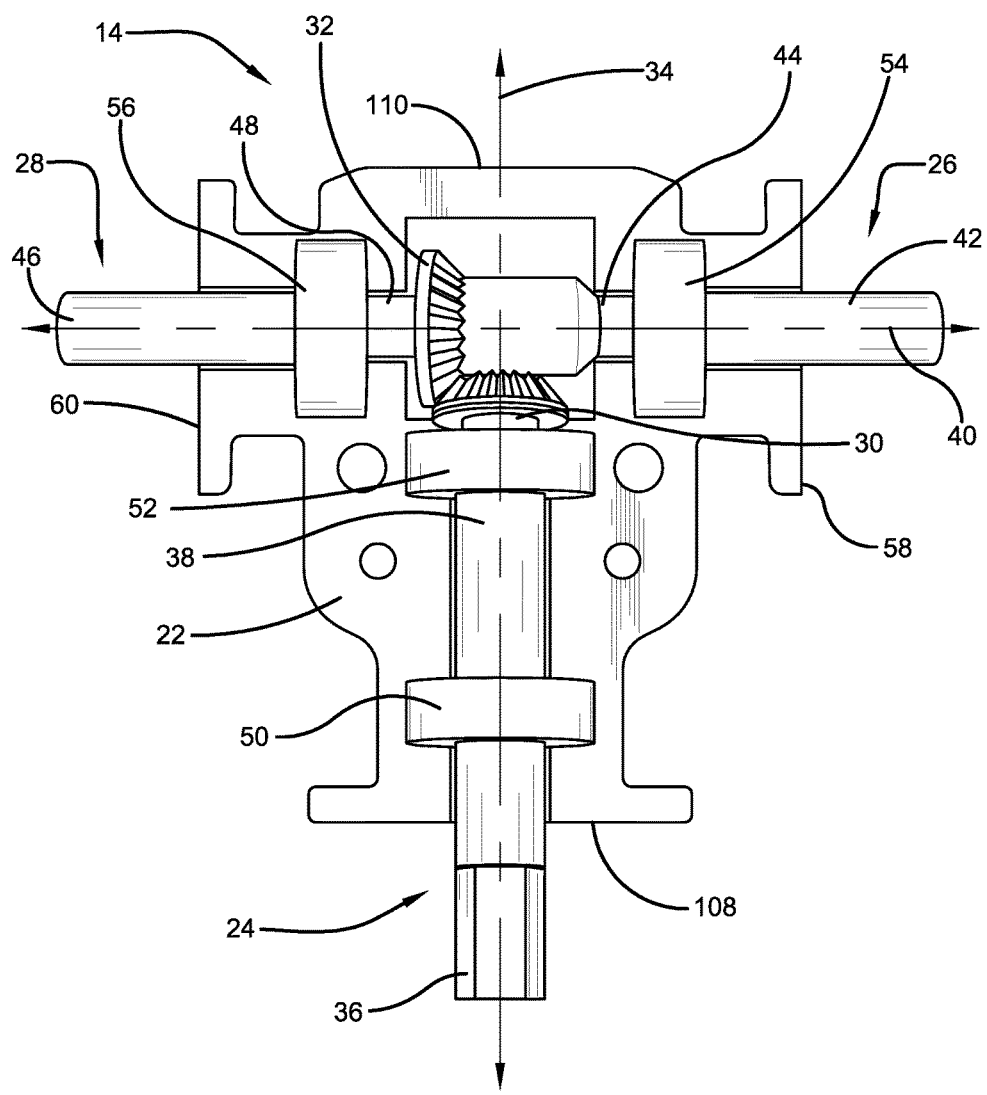
FIG. 2 is a cross-sectional view of a gear box assembly taken along section lines 2-2 in FIG. 1.

As best shown in FIG. 2, the gear box assembly 14 can include a housing 22, an input shaft 24, a first output shaft 26, a second output shaft 28, and a plurality of gears 30, 32. It is also noted that the gear box assembly 14 can also include bearings and seals as desired. Exemplary bearings are referenced at 50, 52, 54, and 56. The housing 22 extends along an input shaft axis 34 between an aft end 108 and a forward end 110. The input shaft 24 can extend along the input shaft axis 34 (also referenced as the input shaft longitudinal axis) through the housing 22. The input shaft 24 can extend between a first end 36 positioned outside of the housing 22 and a second end 38 positioned inside of the housing 22. The input shaft 24 extends out of the housing 22 at the aft end 108.

The first output shaft 26 can extend along an output shaft axis 40 (also referenced as the output shaft longitudinal axis) transverse to the input shaft axis 34. The first output shaft 26 can extend through the housing 22 between a first end 42 positioned outside of the housing 22 and a second end 44 positioned inside of the housing 22. The second output shaft 28 can extend along the output shaft axis 40. The second output shaft 28 can extend through the housing 22 between a first end 46 positioned outside of the housing 22 and a second end 48 positioned inside of the housing 22.

The exemplary shafts 26 and 28 can be integral or integrally-formed with respect to one another. "Integrally-formed" refers to the fact that in the exemplary embodiment the exemplary shafts 26 and 28 can be formed together rather than being formed separately and then subsequently joined. The term defines a structural feature since structures that are integrally-formed are structurally different than structures that are comprised of subcomponents formed separately and then subsequently joined. "Integral" means consisting or composed of parts that together constitute a whole and thus encompasses structures of more than one part wherein the parts are either integrally-formed or formed separately and then subsequently joined.

The plurality of gears 30, 32 can be positioned inside of the housing 22. In the exemplary embodiment, the gear 30 can be fixedly mounted on the input shaft 24 for concurrent rotation. In the exemplary embodiment, the gear 32 can be fixedly mounted on the output shafts 26, 28 for concurrent rotation. The plurality of gears 30, 32 can be arranged such that the first output shaft 26 and the second output shaft 28 rotate in response to rotation of the input shaft 24. The first end of the input shaft 24 is configured to be releasibly engageable with a chuck of the hand drill 12. The first end of the input shaft 24 can be cylindrical or can define a hex cross-section.

Figure 3:
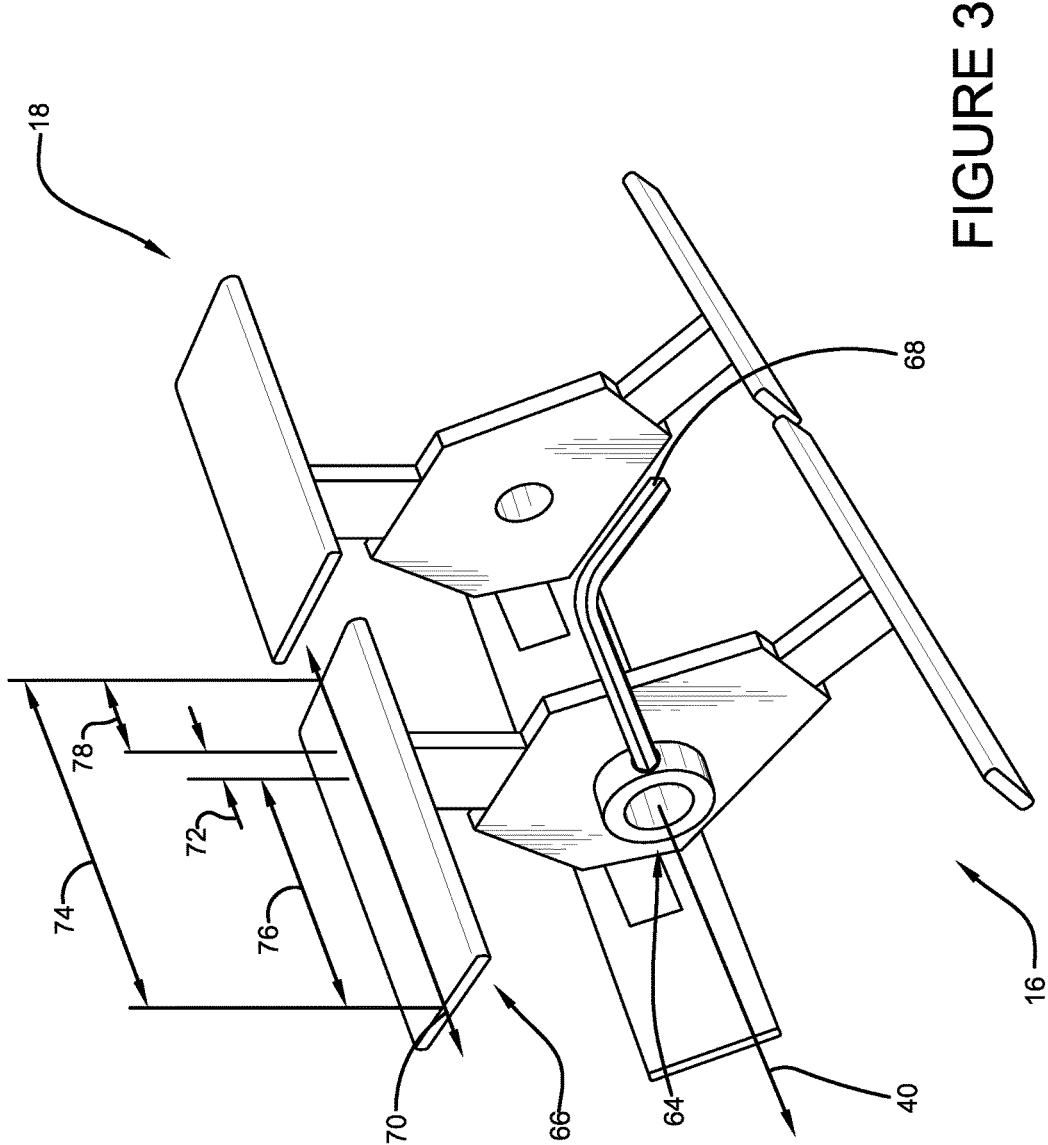
FIG. 3 is a perspective view of tilling wheel assemblies according to the first exemplary embodiment of the present disclosure.

The first tilling wheel assembly 16 can be mounted at the first end 42 of the first output shaft 26. The second tilling wheel assembly 18 can be mounted at the first end 46 of the second output shaft 28. The first and second tilling wheel assemblies 16, 18 can be substantially similar. FIG. 3 shows the first and second tilling wheel assemblies 16, 18, side-by-side, as they can be positioned on opposite lateral sides 58, 60 of the housing 22 in operation. Each of the first and second tilling wheel assemblies 16, 18 can define a respective cutting swath during rotation, each of the respective cutting swaths centered on the output shaft axis 40. A cutting swath of the first tilling wheel assembly 16 is referenced at 62 in FIG. 1. The cutting swath 62 is generally cylindrically-shaped, visible as a circle in the plane of FIG. 1.

As set forth above, the first and second tilling wheel assemblies 16, 18 can be substantially similar. The second tilling wheel assembly 18 is a mirror of the first tilling wheel assembly 16 across a plane containing the input shaft axis 34 and perpendicular to the output shaft axis 40. The description herein of the first tilling wheel assembly 16 is therefore applicable to the second tilling wheel assembly 18.

Referring again to FIG. 3, the first tilling wheel assembly 16 can include a hub 64 and plurality of blades projecting away from the hub 64. An exemplary blade is referenced at 66. The location and orientation of the output shaft axis 40 is shown in FIG. 3 for reference. The hub 64 can include an aperture extending transverse to the output shaft axis 40 and set screw received in that aperture. FIG. 3 shows an Allen wrench 68 engaged with the set screw. The set screw can be utilized to releasibly engage the first tilling wheel assembly 16 to the first output shaft 26. The blade 66 can project away from the hub 64 along a longitudinal axis 70 that is parallel to the output shaft axis 40. All of the exemplary blades are shown projecting away from the hub 64 along respective longitudinal axes that are each parallel to the output shaft axis 40. The blades mounted on the hub 64 of the first tilling wheel assembly 16 and the blades mounted on the hub of the second tilling wheel assembly 18 can be symmetrical with respect to one another across the plane containing the input shaft axis 34 and perpendicular to the output shaft axis 40.

Referring again to FIG. 3, the hub 64 has a thickness defined along the longitudinal axis 70. A portion of the hub 64 has a thickness along the longitudinal axis 70 is referenced at 72. The exemplary blade 66 is a flat rectangular plate. All of the blades can be flat rectangular plates. The blade 66 has a length defined along the longitudinal axis. The length of the blade 66 along the longitudinal axis 70 is referenced at 74. The length 74 includes a first portion (again referenced at 72) overlapping the thickness of the hub 64 along the longitudinal axis 70. The length 74 also includes a second portion 76 extending past an outer face of the hub 64 along the longitudinal axis 70. The length 74 also includes a third portion 78 extending past an inner face of the hub 64 opposite the outer face along the longitudinal axis 70. The second portion 76 and the third portion 78 are greater than the thickness 72. The second portion 76 is greater than the third portion 78.

Figure 4:
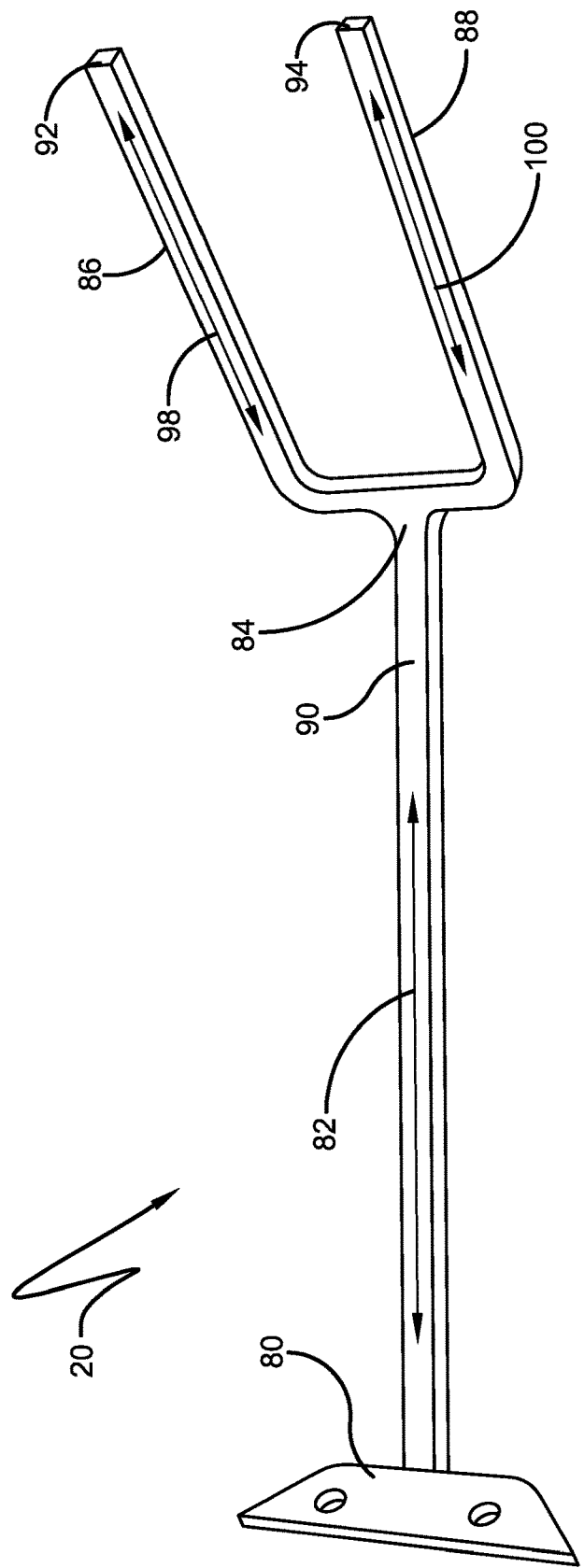
FIG. 4 is a perspective view of a stabilizer fork according to the first exemplary embodiment of the present disclosure.

Referring now to FIG. 4, the stabilizer fork 20 can extend from a base end 80 fixed to the housing 22. The base end 80 of the stabilizer fork 20 engages housing 22 rearward of the cutting swaths of the first and second tilling wheel assemblies 16, 18 along the input shaft axis 34, as shown in FIG. 1. The stabilizer fork 20 can extend along a stabilizer axis 82 transverse to the input shaft axis 34 and to the output shaft axis 40. The exemplary stabilizer axis 82 is oblique to the input shaft axis 34, as shown in FIG. 1. The stabilizer fork 20 can extend to a distal end 84 from which first and second tines 86, 88 project.

The exemplary stabilizer fork 20 is straight between the base end 80 and the distal end 84, but could be arched in other embodiments to define a handle for gripping by the user. Each of the first and second tines 86, 88 can extend further along the input shaft axis 34 than transverse to the input shaft axis 34. This is shown in FIG. 1.

The exemplary base end 80, the distal end 84, the first tine 86, and the second tine 88 can be integral with respect to one another and not releasibly engaged with respect to one another. The base end 80 can be welded to rod portion of 90 of the stabilizer fork 20. The distal end 84 which includes the tines 86, 88 can also be welded to the rod portion 90. In other embodiments, the base end 80, the distal end 84, the first tine 86, and the second tine 88 can be integrally-formed with respect to one another. The base end 80 can include apertures for receiving fasteners that allow the stabilizer fork 20 to be releasibly engaged with the housing 22.

The first tine 86 and the second tine 88 each extend to respective tips 92, 94. The first and second tines 86, 88 are configured such that the tips 92, 94 remain spaced from one another when the micro-tiller module 10 is engaged with the hand drill 12. The first and second tines 86, 88 are configured to be disposed on opposite sides of a handle 96 of the hand drill 12 when the micro-tiller module 10 is engaged with the hand drill 12. The first and second tines 86, 88 are configured to be spaced from and unconnected to one another in operation in the exemplary embodiment of the present disclosure. The distal end 84, engaged to the handle 96 through first and second tines 86, 88, can be arranged to transfer thrust along the input shaft axis 34 without friction as disclosed in the prior art. Thrust can be generated by rotation of the first and second tilling wheel assemblies 16, 18 about the output shaft axis 40 in at least one direction of rotation. The distal end 84 can also prevent rotation of the housing 22 about the input shaft axis 34 through the engagement of the tines 86, 88 with the handle 96.

Referring again to FIG. 1, the input shaft axis 34 and the output shaft axis 40 can be disposed in a first plane. This first plane would appear as an edge in FIG. 1 and can be represented by input shaft axis 34. As shown in FIG. 4, the first and second tines 86, 88 each extend along respective longitudinal tine axes 98, 100. In the exemplary embodiment, the tine axes 98, 100 are disposed in a second plane. This second plane would appear as an edge in FIG. 1 and can be represented by tine axis 98.

As shown in FIG. 1, the exemplary first and second planes are parallel to one another. However, in other embodiments of the present disclosure, the first and second planes can be oblique to one another. An alternative tine is shown in phantom and referenced at 102. In an embodiment including tine 102 the first and second planes would be oblique to one another.

It is also noted that the tines 86, 88 can be different lengths in the various embodiments of the present disclosure. Tines alternative to tine 92 are shown in phantom and referenced at 104 and 106. Tine 104 is longer than tine 92 and tine 106 is shorter than tine 92. It is also noted that one or more portions of the stabilizer fork can be adjustable in other embodiments of the present disclosure. For example, the rod portion 90 can be formed from telescoping members allowing its length to change. Alternatively, the rod portion 90 can be formed from two members interconnected at a selectively-lockable joint so that the rod portion 90 could be non-straight and yet rigid. Further, the distal end 84 could be rotatable relative to the rod portion 90. One or both of the tines 86, 88 could be extendable to different lengths from the distal end 84. Alternatively, the distal end 84 could be extendable laterally to allow the tines 86, 88 to be positioned different distances apart.

The micro-tiller module 10 can also include a shield 112. The shield 112 can be radially spaced from at least partially encircle the respective cutting swaths of the first and second tilling wheel assemblies. The base end 80 of the stabilizer fork 20 can be connected to the housing 22 through the shield 112 such that the shield 112 is interposed between the housing 22 and the base end 80, as shown in FIG. 1.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A micro-tiller module releasibly engageable with a hand drill and comprising:
   a gear box assembly including a housing, an input shaft extending along an input shaft longitudinal axis through said housing between a first end positioned outside of said housing and a second end positioned inside of said housing, a first output shaft extending along an output shaft longitudinal axis transverse to said input shaft longitudinal axis and through said housing between a first end positioned outside of said housing and a second end positioned inside of said housing, a second output shaft extending along said output shaft longitudinal axis and through said housing between a first end positioned outside of said housing and a second end positioned inside of said housing, and a plurality of gears positioned inside of said housing and arranged such that said first output shaft and said second output shaft rotate in response to rotation of said input shaft, wherein said first end of said input shaft is configured to be releasibly engageable with a chuck of the hand drill;
   first and second tilling wheel assemblies, said first tilling wheel assembly mounted at said first end of said first output shaft, said second tilling wheel assembly mounted at said first end of said second output shaft, and each of said first and second tilling wheel assemblies having a hub and plurality of blades projecting away from said hub; and
   a stabilizer fork extending from a base end fixed to said housing, along a stabilizer longitudinal axis transverse to said input shaft longitudinal axis and to said output shaft longitudinal axis, to a distal end from which first and second tines project, each of said first and second tines extending further along said input shaft longitudinal axis than transverse to said input shaft longitudinal axis.

2. The micro-tiller module of claim 1 wherein said stabilizer longitudinal axis is further defined as oblique to said input shaft longitudinal axis.

3. The micro-tiller module of claim 2 wherein said stabilizer fork is further defined as straight between said base end and said distal end.

4. The micro-tiller module of claim 1 wherein said base end, said distal end, said first tine, and said second tine of said stabilizer fork are further defined as integrally-formed with respect to one another.

5. The micro-tiller module of claim 1 wherein each of said first tine and second tine extend to respective tips and wherein said first and second tines are configured such that said tips remain spaced from one another when said micro-tiller module is engaged with the hand drill.

6. The micro-tiller module of claim 1 wherein said first and second tines are configured to be disposed on opposite sides of a handle of the hand drill when said micro-tiller module is engaged with the hand drill.

7. The micro-tiller module of claim 1 wherein:
   said input shaft longitudinal axis and said output shaft longitudinal axis are disposed in a first plane; and
   said first and second tines each extend along respective longitudinal tine axes and said respective longitudinal tine axes are disposed in a second plane, said first and second planes being parallel to one another.

8. The micro-tiller module of claim 1 wherein:
   said input shaft longitudinal axis and said output shaft longitudinal axis are disposed in a first plane; and
   said first and second tines each extend along respective longitudinal tine axes and said respective longitudinal tine axes are disposed in a second plane, said first and second planes being oblique to one another.

9. The micro-tiller module of claim 1 wherein at least one of said plurality of blades projects away from said respective hub along a longitudinal axis that is parallel to said output shaft longitudinal axis.

10. The micro-tiller module of claim 9 wherein all of said plurality of blades project away from said respective hub along respective longitudinal axes that are each parallel to said output shaft longitudinal axis.

11. The micro-tiller module of claim 9 wherein said respective hub has a thickness defined along said longitudinal axis and said at least one of said plurality of blades has a length defined along said longitudinal axis, wherein said length of said at least one of said plurality of blades includes a first portion overlapping said thickness of said respective hub along said longitudinal axis and a second portion extending past an outer face of said respective hub along said longitudinal axis and a third portion extending past an inner face of said respective hub opposite said outer face along said longitudinal axis, wherein said second portion and said third portion are greater than said thickness.

12. The micro-tiller module of claim 11 wherein said second portion is greater than said third portion.

13. The micro-tiller module of claim 1 wherein a first of said plurality of blades mounted on said hub of said first tilling wheel assembly and a first of said plurality of blades mounted on said hub of said second tilling wheel assembly are symmetrical with respect to one another across a plane that contains said input shaft longitudinal axis and is perpendicular to said output shaft longitudinal axis.

14. The micro-tiller module of claim 13 wherein each of said plurality of blades projects mounted on said hub of said first tilling wheel assembly is symmetrical with respect to one of said plurality of blades projects mounted on said hub of said second tilling wheel assembly across the plane.

15. The micro-tiller module of claim 1 wherein at least one of said plurality of blades is a flat rectangular plate.

16. The micro-tiller module of claim 1 wherein all of said plurality of blades are flat rectangular plates.

17. The micro-tiller module of claim 1 wherein said housing extends along said input shaft longitudinal axis between an aft end and a forward end, said input shaft extending out of said housing at said aft end, each of said first and second tilling wheel assemblies define a respective cutting swath during rotation, and said base end of said stabilizer fork engages said housing rearward of said cutting swaths of said first and second tilling wheel assemblies along said input shaft longitudinal axis.

18. The micro-tiller module of claim 17 wherein said distal end is arranged to transfer thrust along said input shaft longitudinal axis without friction, the thrust generated by rotation of said first and second tilling wheel assemblies about said output shaft longitudinal axis in at least one direction of rotation.

19. The micro-tiller module of claim 18 wherein respective tips of said first and second tines are configured to be spaced from and unconnected to one another in operation.

20. The micro-tiller module of claim 1 further comprising:
a shield, wherein each of said first and second tilling wheel assemblies define a respective cutting swath during rotation, each of said respective cutting swaths centered on said output shaft longitudinal axis, said shield radially spaced from and at least partially encircling said respective cutting swaths, said base end of said stabilizer fork connected to said housing through said shield such that said shield is interposed between said housing and said base end.

* * * * *